United States Patent [19]

Carlsson et al.

[11] Patent Number: 5,096,137
[45] Date of Patent: * Mar. 17, 1992

[54] DETACHABLE TRIGGER MECHANISM IN AN OPEN-FACE FISHING REEL OF THE FIXED-SPOOL TYPE

[75] Inventors: Karl L. Carlsson, Asarum; Bengt-Åke Henriksson, Svangsta, both of Sweden

[73] Assignee: Abu Garcia Produktion AB, Svangsta, Sweden

[ * ] Notice: The portion of the term of this patent subsequent to Jun. 11, 2008 has been disclaimed.

[21] Appl. No.: 618,797

[22] Filed: Nov. 28, 1990

[51] Int. Cl.⁵ ............................................. A01K 89/01
[52] U.S. Cl. .................................................... 242/233
[58] Field of Search ............................... 242/232, 233

[56] References Cited

U.S. PATENT DOCUMENTS

| | | | |
|---|---|---|---|
| 3,226,873 | 1/1966 | Wood | 242/233 |
| 3,233,845 | 2/1966 | Inamura | 242/233 |
| 4,921,188 | 5/1990 | Smith | 242/233 |
| 5,022,605 | 6/1991 | Carlsson | 242/233 |

*Primary Examiner*—Katherine Matecki
*Attorney, Agent, or Firm*—Browdy and Neimark

[57] ABSTRACT

An open-face fishing reel of the fixed-spool type has a rotor, a line spool coaxial with the rotor, a bail for winding a line onto the spool and a detachable trigger mechanism. Two attachments are provided on the rotor. Two mounting elements supporting the bail are so rotatably mounted each on one attachment that the bail is pivotal about a bail axis perpendicular to the rotor axis, between a folded-in line-winding position and a folded-out position in which it is released of the line. One attachment has a recess. The trigger mechanism consists of a lever having a pivot pin engaging in the recess. The lever is rotatable about a first axis parallel to the bail axis and defined by the pivot pin between a first position and a second position. The lever is rotatably connected about a second axis parallel to the bail axis, to one mounting element by means of a driver pin adapted, upon rotation of the lever from the first position to the second position, to rotate the mounting element and thereby pivot the bail from its folded-in line-winding position to its folded-out position.

2 Claims, 3 Drawing Sheets

FIG_1 PRIOR ART

DETACHABLE TRIGGER MECHANISM IN AN OPEN-FACE FISHING REEL OF THE FIXED-SPOOL TYPE

FIELD OF THE INVENTION

The present invention relates to a trigger mechanism in an open-face fishing reel of the fixed-spool type.

DESCRIPTION OF THE PRIOR ART

Prior art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle and, thus, the line spool in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line onto the line spool. During line retrieve, the line is thus wound onto the line spool which, as opposed to the rotor, does not rotate, but instead executes an axial oscillatory movement. In this manner, the line will be distributed across the line spool.

The bail mechanism has a bail for winding the line onto the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between a folded-in line-winding position in which it extends substantially at right angles to the spindle, and a folded-out position in which it is located on the opposite side of the spindle and makes an angle therewith which is of the order of 45°. The bail is maintained in its two positions by a spring arranged in one of the attachments underneath a cover plate fixed thereon. The bail can be pivoted to the folded-out position before a cast by means of a trigger mechanism mounted on one attachment and engaging one of the mounting elements.

A known trigger mechanism has an angle arm, one shank of which is rotatably connected to the mounting element and the other shank of which has a longitudinal groove. The trigger mechanism further has a trigger pivotally connected to the attachment by means of a screw screwed in one side wall of the attachment. On its side facing the attachment, the trigger has a projection engaging in the longitudinal groove. When the trigger is pivoted, e.g. with the index finger, a short distance away from the attachment about its axis defined by the screw, the mounting element is turned in such a direction that the bail is pivoted to the folded-out position. When the trigger is released, it is returned to its initial position by a spring, the projection of the trigger running freely in the groove without returning the mounting element.

This known trigger mechanism thus is made up of a plurality of components and therefore is rather complicated to mount and dismount, which is a considerable drawback since some fishermen wish to have a fishing reel with a trigger mechanism and others a fishing reel without any such mechanism. Therefore, two different fishing reel variants of each basic embodiment are often manufactured, namely one variant with and another variant without a trigger mechanism.

SUMMARY OF THE INVENTION

The object of the present invention is to overcome this drawback and provide a very simple trigger mechanism which is so designed that it can be mounted on and dismounted from the fishing reel in an extremely convenient way.

According to the present invention, this object is achieved by means of a detachable trigger mechanism in an open-face fishing reel of the fixed-spool type having a housing, a rotor mounted on said housing, a line spool coaxial with said rotor and adapted to oscillate in the axial direction, and a bail mechanism having a bail for winding a line onto said line spool, two attachments arranged on said rotor substantially diametrically opposite each other, and two mounting elements carrying said bail and being so rotatably mounted on a respective one of said attachments that said bail is pivotable about a bail axis substantially at right angles to the axis of said rotor, between a folded-in line-winding position and a folded-out position in which said bail is released of the line, at least one of said attachments being designed so as to form an open chamber and having a cover plate detachably mounted over said chamber in order, together with the corresponding mounting element, to cover said chamber and having a recess at its side facing away from said chamber, said trigger mechanism having a trigger in the form of a lever having a pivot pin engaging in said recess of said cover plate, said lever being rotatable about a first axis parallel to the bail axis and defined by said pivot pin, in relation to said cover plate to be rotated between a first position and a second position, and said lever being rotatably connected about a second axis parallel to the bail axis, to the mounting element cooperating with said cover plate, by means of a driver pin detachably mounted in said mounting element and adapted, upon rotation of said lever from said first position to said second position, to rotate said mounting element from its position of rotation corresponding to the folded-in line-winding position of the bail, to its position of rotation corresponding to the folded-out position of the bail.

BRIEF DESCRIPTION OF THE DRAWINGS

The invention will now be described in more detail with reference to the accompanying drawings, in which.

DETAILED DESCRIPTION OF EMBODIMENTS

Figure 1:
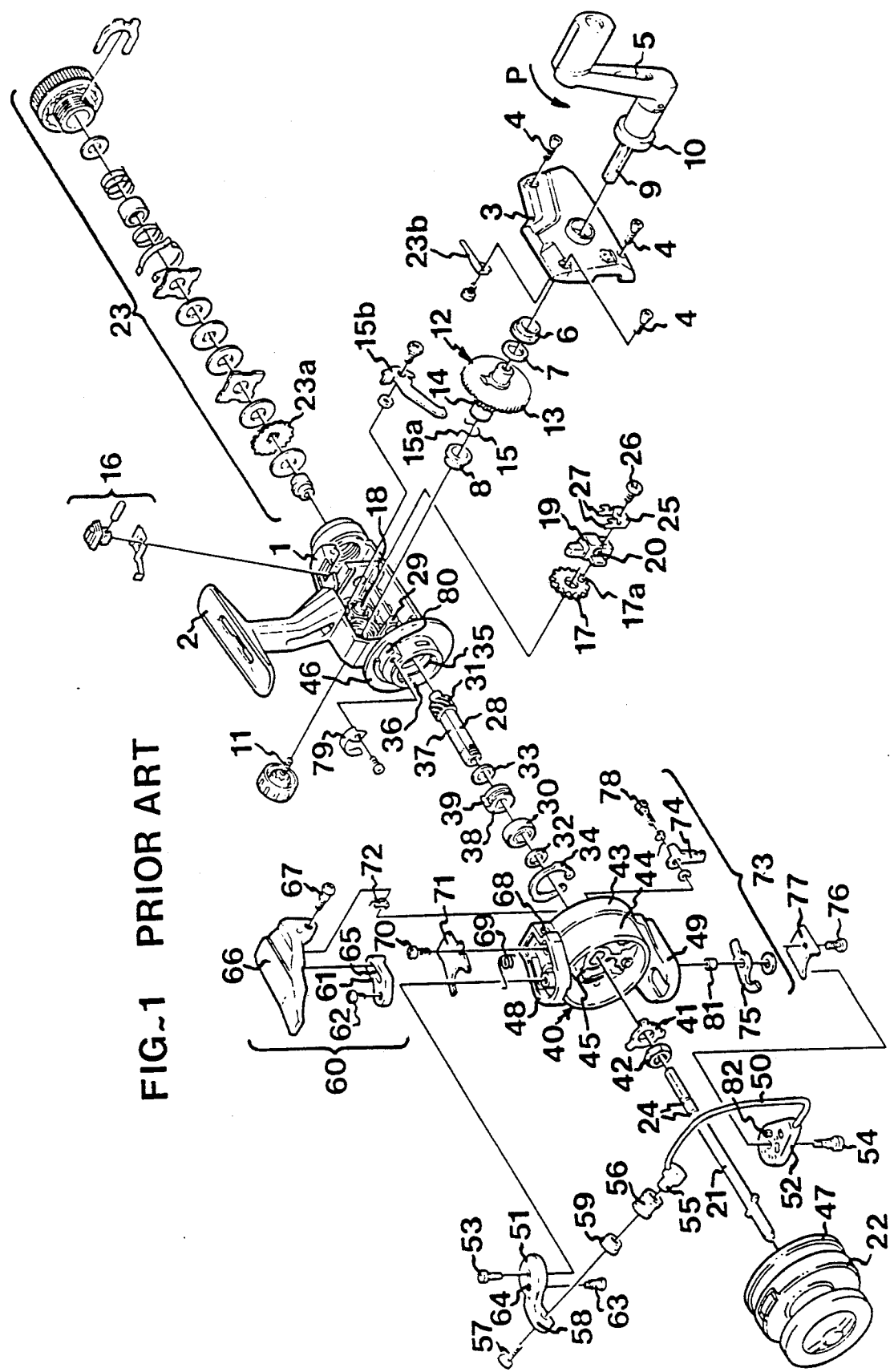
FIG. 1 is an exploded view showing a known open-face fishing reel of the fixed-spool type equipped with the known trigger mechanism briefly described above.

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The shaft 9 has square cross-section throughout the major part of its length and non-rotatably carries a gear unit 12. The gear unit 12 comprises a driving gear 13 with axially directed teeth on its side facing away from the cover 3, and a smaller driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed in the housing 1 so as to form a so-called silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the smaller driving gear 14 and has an axially directed eccentric pin 17a engaging in a vertical groove (not shown) in a driver element 19. The driver element 19 has a through bore 20 through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24 between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21 which is however rotatable relative to the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball bearing 30 in the end wall of the housing 1 opposite the brake mechanism 23. On its inner end, the rotor shaft 28 carries a gear 31 nonrotatably connected thereto and meshing with the larger driving gear 13. The ball bearing 30 is surrounded by two spacer washers 32 and 33 and maintained in place by a locking washer 34 engaging in an inner groove 35 in a sleeve 36 axially projecting from said end wall of the housing 1. The rotor shaft 28 has two diametrically opposed planar surfaces 37 forming a so-called flat and non-rotatably carrying a ring 38 between the ball bearing 30 and the spacer washer 33. The ring 38 has a radial stop lug 39 for cooperating with the pawl 15b.

On its outer end, the rotor shaft 28 non-rotatably carries a rotor 40 secured to the rotor shaft by a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54 forming a pivot shaft for the bail at right angles to the spindle 21. The bail 50 is pivotable between an operative folded-in position which is shown in FIG. 1 and in which it extends substantially at right angles to the spindle 21, and an inoperative folded-out position in which it is located on the opposite side of the spindle 21 and makes an angle therewith which is of the order of 45°.

A bearing pin 55 for a line roller 56 is fixed to one end of the bail 50. This end of the bail is connected to the mounting element 51 by a screw 57 extending through an arm 58 on the mounting element 51 and through a spacer sleeve 59 and screwed in the bearing pin 55.

When turning the handle 5 in the direction of line retrieve P, i.e. in the direction in which a fishing line (not shown) fixed to the line spool 22 is wound onto the line spool, the larger driving gear 13 drives the gear 31, such that the rotor 40 and, thus, the bail 50 are rotated. At the same time, the smaller driving gear 14 drives the oscillating gear 17, such that the driver element 19, by the engagement of the eccentric pin 17a in the vertical groove therein, is moved back and forth so as to oscillate the spindle 21 and, thus, the line spool 22 in the longitudinal direction of the spindle. The spindle 21 and the line spool 22 are however not rotated during line retrieve. The fishing line runs over the line roller 56 on the folded-in bail 50 and is wound onto the line spool 22 during the rotation of the bail. Since the line spool 22 is oscillated during the line winding operation, the line is distributed axially across the line spool.

Before a cast is to be made, the bail 50 is pivoted to the folded-out position so as to release the line from the line roller 56. During the cast, the line is paid out from the line spool 22 which, like the rotor 40, remains still during the cast. When line retrieve is again to be effected after the cast, the bail 50 is automatically swung back to the folded-in position, and the line is placed on the line roller 56.

The bail 50 can be seized with one hand for pivoting from the folded-in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61, one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing the attachment 48, the trigger 66 has a projection (not shown) engaging in the groove 65. When the trigger 66 is pivoted, for instance by the index finger, a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a torque spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is turned in the direction opposite to the direction of line retrieve P, the rotor shaft 28 and, thus, the ring 38 non-rotatably mounted thereon being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is the position shown in FIG. 1.

The above-mentioned automatic return of the bail 50 to its folded-in position as soon as line retrieve is commenced after a cast, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79, on the fixed sleeve 36. The lever 75 is rotatable about a pin 81 parallel to the screw 54 about which the mounting element 52 is rotatable. The mounting element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74 which in turn acts on the lever 75 in such a direction that, by cooperating with the projection 82, it will pivot the bail 50 to its folded-in position.

In the known fishing reel described above, the trigger mechanism suffers from the shortcoming, as stated by way of introduction, of being rather complicated to mount and dismount.

Figure 2:
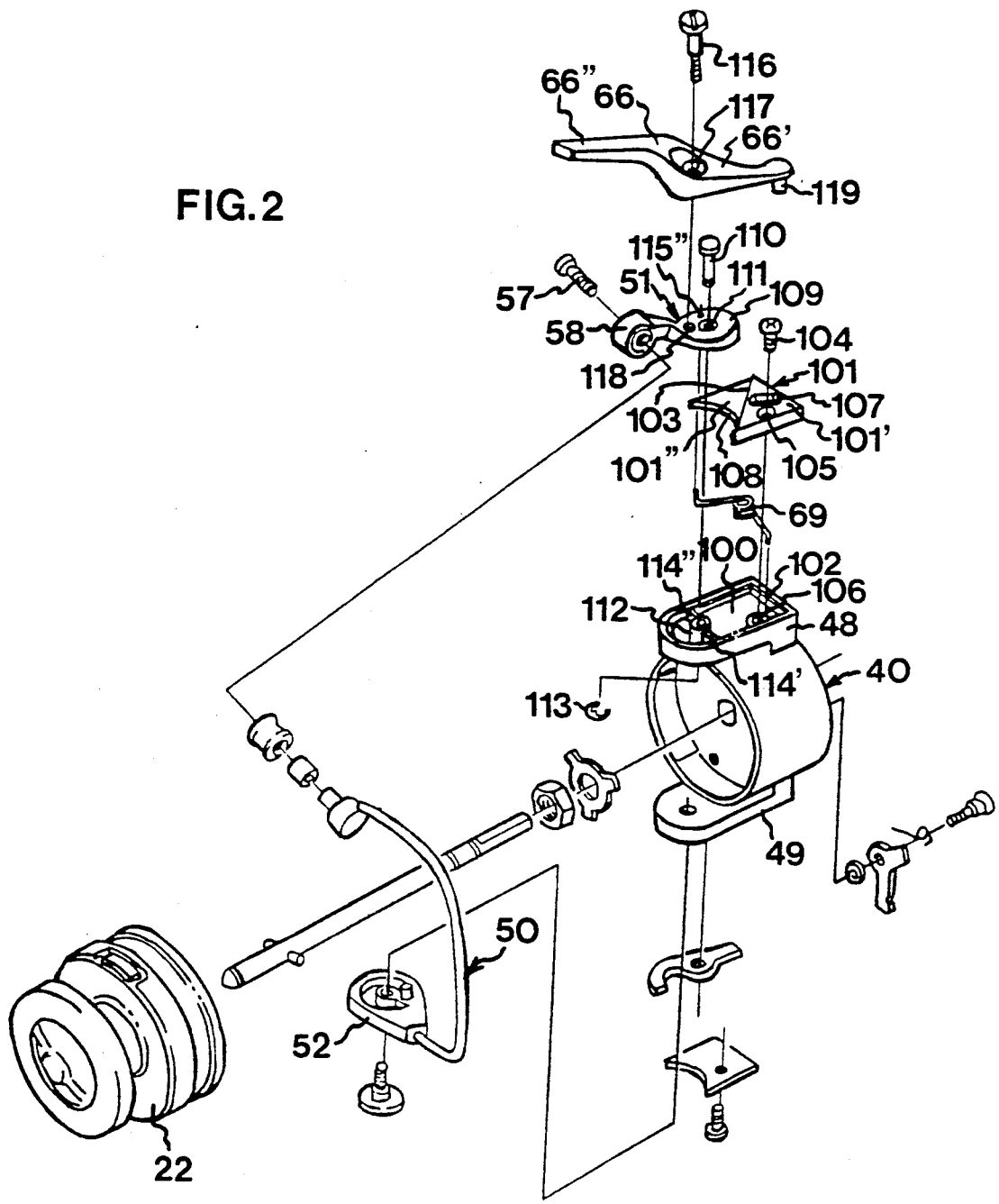
FIG. 2 is a partial exploded view showing an open-face fishing reel of the fixed-spool type equipped with a detachable trigger mechanism according to the present invention, illustrating only the portion of the fishing reel which is of particular interest in the inventive context.
Figure 3:
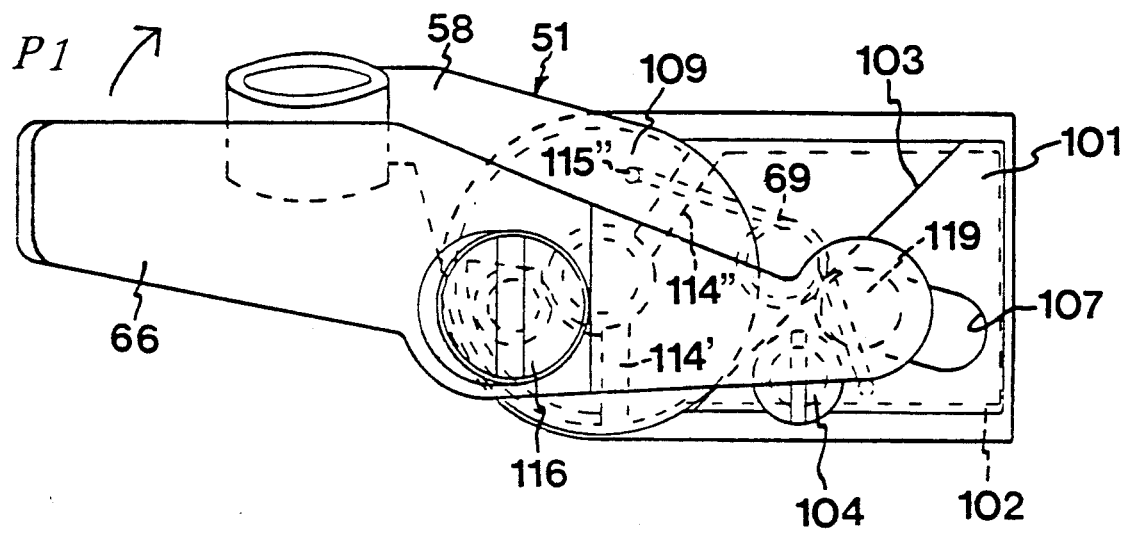
FIG. 3 is a top plan view showing the trigger mechanism in a first position.
Figure 4:
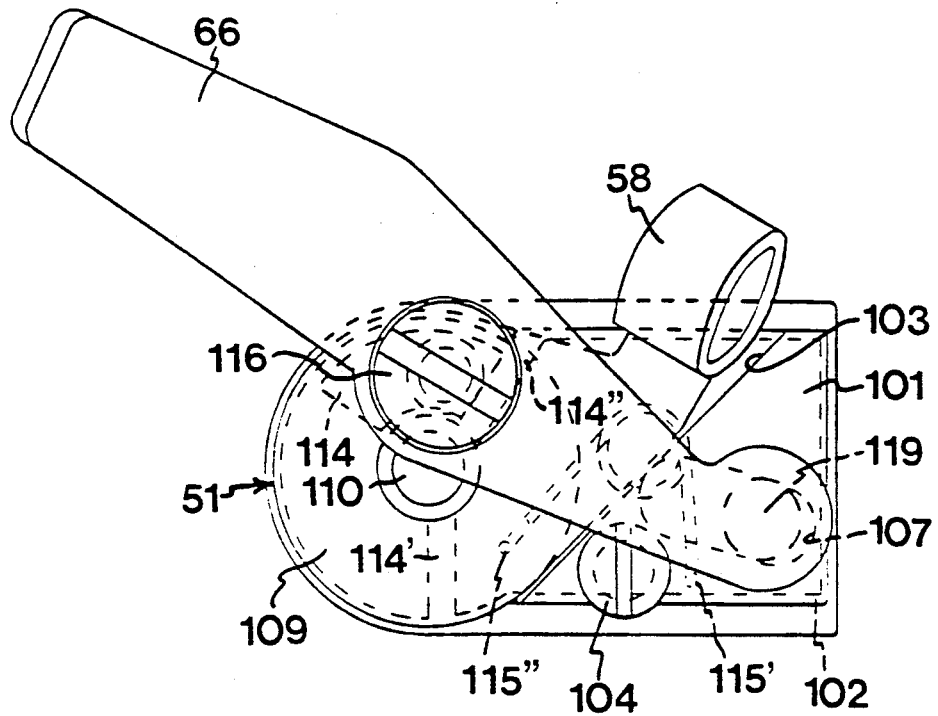
FIG. 4 is a top plan view showing the trigger mechanism in a second position.

An open-face fishing reel of the fixed-spool type provided with a trigger mechanism according to the present invention will now be described in more detail with reference to FIGS. 2-4. FIG. 2, corresponding to FIG. 1, illustrates only that part of the fishing reel which is of particular interest in the present invention. The components of the fishing reel not shown in FIG. 2 and not described in more detail with reference to FIGS. 2-4 are essentially similar to the corresponding components in the fishing reel of FIG. 1.

The attachment 48 in the fixed-spool type fishing reel according to FIG. 2 is so designed as to form an open chamber 100 and has a cover plate 101 which is mounted over the rear portion of the chamber. The cover plate 101 engages an abutment 102 formed in the chamber 100 and extending along the rear wall of the chamber and from there a certain distance forwards along the two side walls of the chamber. The cover plate 101 has a thick portion 101' and a thin portion 101" separated by a shoulder 103 located on the top face of the cover plate and extending substantially along one diagonal of the cover plate. The cover plate 101 is fixed to the attachment 48 by a screw 104 passing through a hole 105 in the thick portion 101' of the cover plate and screwed in a threaded bore in a base 106 provided in the chamber 100 adjacent one side wall thereof and forming part of the abutment 102. In the top face of the thick portion 101', the cover plate 101 has an elongate recess or notch 107 extending a certain distance substantially along the other diagonal of the cover plate. At its front end, the cover plate 101 has a circular-arc-shaped recess 108 formed in the thin portion 101" thereof.

The mounting element 51 has a circular disc portion 109 of substantially the same diameter as the recess 108 of the cover plate 101. The mounting element 51 is rotatably fixed to the attachment 48 by means of a pin 110 corresponding to the screw 53 in FIG. 1 and passing through a centre hole 111 in the disc portion 109 and through a through bore in a base 112 provided in the chamber 100 in the front portion thereof. The pin 110 is held in place by a locking washer 113 at the underside of the attachment 48. The disc portion 109 and the cover plate 101 together cover the chamber 100. At its underside, the disc portion 109 has a circular-arc-shaped stop lug 114 (FIGS. 3 and 4) adapted to cooperate with two projections 114' and 114" radially projecting from the base 112.

The mounting element 51 is rotatable between a first position (FIG. 3) in which the stop lug 114 of the disc portion 109 engages one projection 114' and which corresponds to the folded-in position of the bail 50, and a second position (FIG. 4) in which the stop lug 114 engages the other projection 114" and which corresponds to the folded-out position of the bail 50. The mounting element 51 is retained in its two end positions by the torque spring 69 engaging with one end in a hole 115' in the bottom wall of the chamber 100 and with its other end in an eccentrically positioned hole 115" in the disc portion 109.

As mentioned in the description of the fishing reel shown in FIG. 1, the bail 50 can be seized with one hand to be pivoted from its folded-in position to its folded-out position. The fishing reel according to FIG. 2 as now described can be supplemented in a very simple manner, if desired, with a detachable trigger mechanism 60 according to the present invention.

The trigger mechanism 60 of the invention consists solely of a trigger 66 in the form of a lever having a rear arm 66' and a front arm 66" which is designed to form a convenient index-finger grip. The trigger 66 is rotatably connected to the disc portion 109 of the mounting element 51 by means of a shoulder screw 116 passing through a hole 117 in the trigger 66 and screwed in an eccentrically positioned hole 118 in the disc portion 109. The rear arm 66' has a flat underside engaging the upper side of the disc portion 109 and of the cover plate 101. At its rear end, the rear arm 66' has a downwardly projecting pivot pin 119 engaging in the notch 107.

When the bail 50 should be pivoted from its folded-in position to its folded-out position, i.e. when the mounting element 51 should be rotated from its first position shown in FIG. 3, to its second position shown in FIG. 4, the user seizes the front arm 66" of the trigger 66 with his index finger and turns the trigger about the pivot pin 119 in the direction of the arrow P1 away from the position shown in FIG. 3, to the position shown in FIG. 4. To permit carrying out such a rotation of the trigger 66 in as simple a manner as possible with the index finger, the trigger should, in the stop position described above with reference to FIG. 1, be in a position which with respect to the position shown in FIG. 1 is slightly offset clockwise (as seen from in front).

As appears from the foregoing, the detachable trigger mechanism according to the present invention consists of a single element, namely the trigger 66, which in an extremely simple manner can be mounted on and dismounted from the fishing reel by means of the shoulder screw 116.

What we claim and desire to secure by Letters Patent is:

1. A detachable trigger mechanism in an open-face fishing reel of the fixed-spool type having a housing, a rotor mounted on said housing, a line spool coaxial with said rotor and adapted to oscillate in the axial direction, and a bail mechanism having a bail for winding a line onto said line spool, two attachments arranged on said rotor substantially diametrically opposite each other, and two mounting elements carrying said bail and being so rotatably mounted on a respective one of said attachments that said bail is pivotable about a bail axis substantially at right angles to the axis of said rotor, between a folded-in line-winding position and a folded-out position in which said bail is released of the line, at least one of said attachments being designed so as to form an open chamber and having a cover plate detachably mounted over said chamber in order, together with the corresponding mounting element, to cover said chamber and having a recess at its side facing away from said chamber, said trigger mechanism having a trigger in the form of a lever having a pivot pin engaging in said recess of said cover plate, said lever being rotatable about a first axis parallel to the bail axis and defined by said pivot pin, in relation to said cover plate to be rotated between a first position and a second position, and said lever being rotatably connected about a second axis parallel to the bail axis, to the mounting element cooperating with said cover plate, by means of a driver pin detachably mounted in said mounting element and adapted, upon rotation of said lever from said first position to said second position, to rotate said mounting element from its position of rotation corresponding to the folded-in line-winding position of the bail, to its position of rotation corresponding to the folded-out position of the bail.

2. Mechanism as claimed in claim 1, wherein the driver pin comprises a screw passing through a hole in the lever and screwed in a hole in said mounting element.

* * * * *